United States Patent
Uozumi et al.

(10) Patent No.: US 12,282,372 B2
(45) Date of Patent: Apr. 22, 2025

(54) ELECTRONIC APPARATUS HAVING PORTABLE HOUSING AND POWER SUPPLY CIRCUIT

(71) Applicant: SEIKO EPSON CORPORATION, Tokyo (JP)

(72) Inventors: Hiroshi Uozumi, Matsumoto (JP); Koichi Hatanaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 74 days.

(21) Appl. No.: 18/192,728

(22) Filed: Mar. 30, 2023

(65) Prior Publication Data
US 2023/0315182 A1 Oct. 5, 2023

(30) Foreign Application Priority Data
Mar. 31, 2022 (JP) ................. 2022-057890

(51) Int. Cl.
*G06F 1/3206* (2019.01)
*G06F 1/3296* (2019.01)

(52) U.S. Cl.
CPC .......... *G06F 1/3206* (2013.01); *G06F 1/3296* (2013.01)

(58) Field of Classification Search
CPC .... G06F 1/3206; G06F 1/3296; G06F 1/3212; G06F 1/3278; G06F 1/26
See application file for complete search history.

(56) References Cited

U.S. PATENT DOCUMENTS

| | | | |
|---|---|---|---|
| 9,575,466 B1* | 2/2017 | Thompson | G04B 47/06 |
| 11,569,771 B2* | 1/2023 | Oonishi | H03K 3/037 |
| 2010/0060235 A1* | 3/2010 | Dommaschk | H02M 7/4835 320/128 |
| 2012/0331313 A1* | 12/2012 | Yoshioka | G06F 1/3284 713/300 |
| 2018/0278170 A1 | 9/2018 | Oonishi et al. | |
| 2019/0028049 A1* | 1/2019 | Oonishi | H02K 35/02 |
| 2019/0165587 A1* | 5/2019 | Matsuda | H01M 10/48 |

FOREIGN PATENT DOCUMENTS

JP 2018-157724 A 10/2018

* cited by examiner

*Primary Examiner* — Raymond N Phan
(74) *Attorney, Agent, or Firm* — Oliff PLC

(57) ABSTRACT

An electronic apparatus including a power generation module including a power generation unit and a battery configured to store power generated by the power generation unit, a detection device, a drive unit including a plurality of circuits including a circuit configured to output a voltage to the detection device based on the power of the power generation module, a second capacitor unit electrically coupled in parallel to the battery, and a portable housing configured to accommodate the power generation module, the detection device, the drive unit, and the second capacitor unit.

8 Claims, 10 Drawing Sheets

ELECTRONIC APPARATUS HAVING PORTABLE HOUSING AND POWER SUPPLY CIRCUIT

The present application is based on, and claims priority from JP Application Serial Number 2022-057890, filed Mar. 31, 2022, the disclosure of which is hereby incorporated by reference herein in its entirety.

BACKGROUND

1. Technical Field

The present disclosure relates to an electronic apparatus and a power supply circuit.

2. Related Art

Recently, a generator that can be used as a power supply of an electronic apparatus is known. JP-A-2018-157724 discloses a power generation system using a vibration power generator that generates power by vibration. The power generation system starts power supply to an external load when an average value of an output voltage of the vibration power generator becomes equal to or greater than a reference voltage.

It is expected that a generator is mounted on a small electronic apparatus and is used as a power supply of the electronic apparatus. However, power output by a miniaturized generator is limited. Thus, when the power consumption of the load is large, it is difficult to normally operate the load. For example, since an excessive inrush current flows when the load is activated, there is a possibility that the generator cannot supply sufficient power and the load is not activated. Therefore, there is a demand for a technique for stably operating an electronic apparatus by using a generator that can be mounted on the electronic apparatus.

SUMMARY

An aspect of the present disclosure is an electronic apparatus including a power generation module including a power generation unit and a first capacitor unit configured to store power generated by the power generation unit, a detection device, a drive unit including a plurality of circuits including a circuit configured to output a voltage to the detection device based on the power of the power generation module, a second capacitor unit electrically coupled in parallel to the first capacitor unit, and a portable housing configured to accommodate the power generation module, the detection device, the drive unit, and the capacitor unit.

Another aspect of the present disclosure is a power supply circuit for an electronic apparatus including a detection device, the power supply circuit including a power generation module including a power generation unit and a first capacitor unit configured to store power generated by the power generation unit, a drive unit including a plurality of circuits including a circuit configured to output a voltage to the detection device based on the power of the power generation module, and a second capacitor unit electrically coupled in parallel to the first capacitor unit, wherein the power supply circuit is accommodated in a portable housing included in the electronic apparatus.

DESCRIPTION OF EXEMPLARY EMBODIMENTS

1. First Exemplary Embodiment

Figure 1:
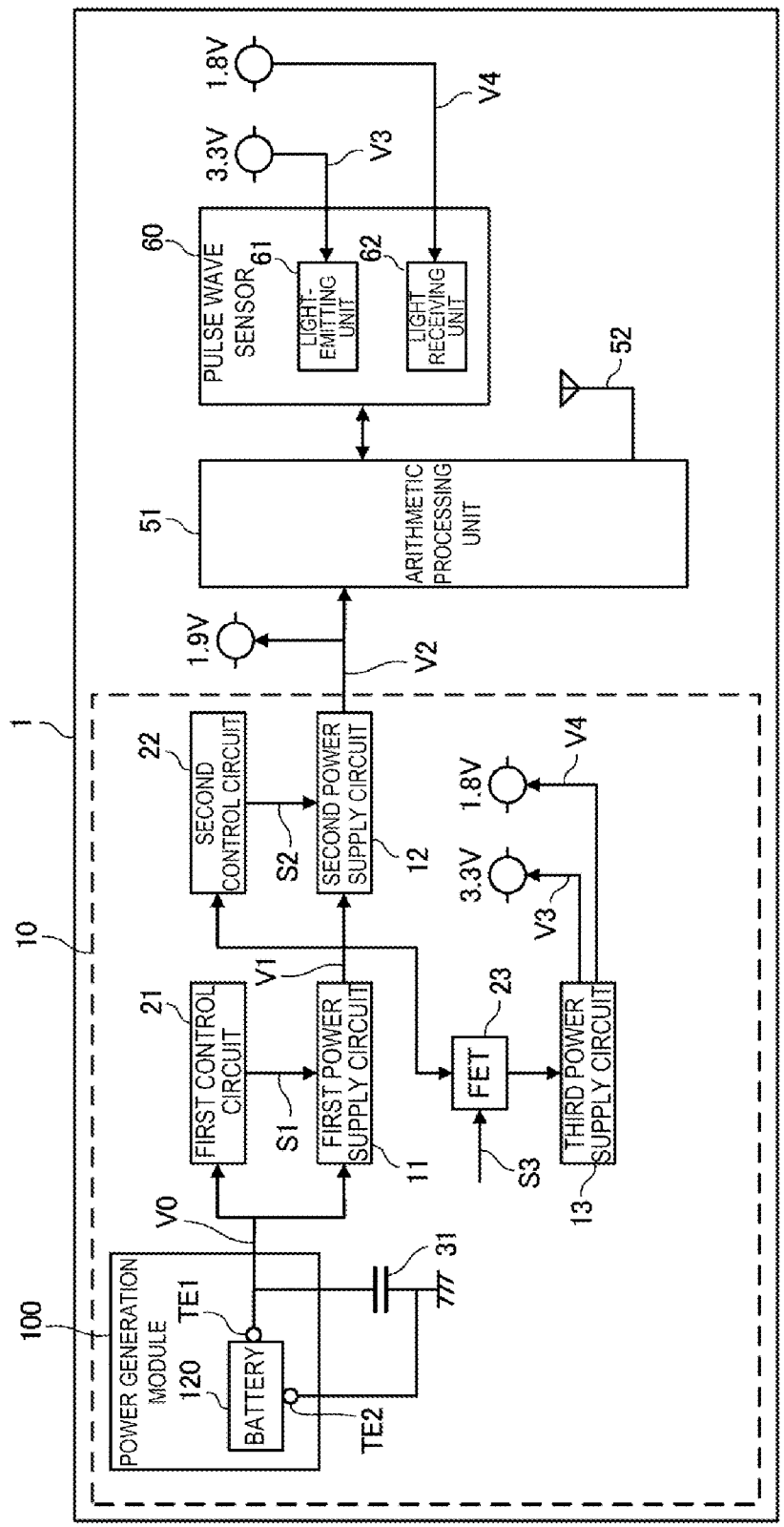
FIG. 1 is a circuit diagram of an electronic apparatus of a first exemplary embodiment.

FIG. 1 is a circuit diagram of an electronic apparatus 1 of a first exemplary embodiment.

The electronic apparatus 1 is a portable device. In the present exemplary embodiment, a wristwatch-type electronic apparatus 1 which is used by being attached to an arm, etc. of a user will be described.

A pulse wave sensor 60 that measures a pulse of the user is mounted on the electronic apparatus 1. In the present exemplary embodiment, an optical pulse wave sensor 60 is exemplified. The pulse wave sensor 60 includes a light-emitting unit 61 and a light receiving unit 62. The light-emitting unit 61 includes a light source such as a light-emitting diode (LED). The light receiving unit 62 is a photosensor. The pulse wave sensor 60 detects a pulse wave of the user by causing the light-emitting unit 61 to emit light and detecting reflected light from a body of the user, which is a measurement target, using the light receiving unit 62. The pulse wave sensor 60 corresponds to an example of a detection device or a sensor.

Figure 2:
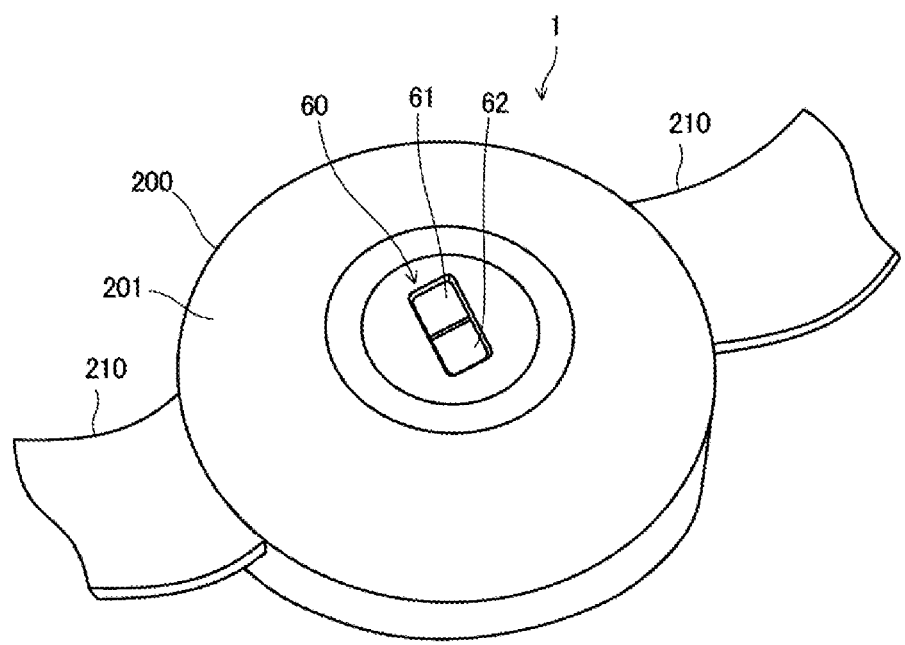
FIG. 2 is a perspective view of the electronic apparatus.

FIG. 2 is a perspective view of the electronic apparatus 1, and illustrates a configuration of a main part on a back surface side.

In an example illustrated in FIG. 2, the electronic apparatus 1 includes a wristwatch-type housing 200, and each unit illustrated in FIG. 1 is accommodated in the housing 200. The light-emitting unit 61 and the light receiving unit 62 of the pulse wave sensor 60 are exposed on a back surface 201 of the housing 200. A band 210 for wrapping the housing 200 around the arm or the foot of the user is attached to the housing 200. By winding the band 210 around the arm or the foot of the user, the housing 200 is fixed in a state where the back surface 201 is in contact with a skin of the user. The band 210 corresponds to an example of an attachment jig.

Returning to FIG. 1, the electronic apparatus 1 includes an arithmetic processing unit 51 that controls each unit of the electronic apparatus 1. The arithmetic processing unit 51 is, for example, a microcontroller or a microprocessor. The arithmetic processing unit 51 corresponds to an example of a third control circuit.

The arithmetic processing unit 51 incorporates a wireless communication circuit. The arithmetic processing unit 51 includes an antenna 52 and performs wireless communication using the antenna 52. The arithmetic processing unit 51 executes wireless communication by, for example, Bluetooth Low Energy. The arithmetic processing unit 51 may be configured to execute communication by another short-range wireless communication method. For example, the arithmetic processing unit 51 may execute wireless communication by Wi-Fi or Zigbee. Bluetooth, Bluetooth Low Energy, Wi-Fi, and Zigbee are registered trademarks. The arithmetic processing unit 51 corresponds to an example of a transmission unit.

The electronic apparatus 1 includes a power supply circuit 10 that supplies power to the arithmetic processing unit 51 and the pulse wave sensor 60.

The power supply circuit 10 includes a power generation module 100. In the present exemplary embodiment, a vibration power generation module that generates power by vibration applied to the housing 200 will be described as an example.

Figure 3:
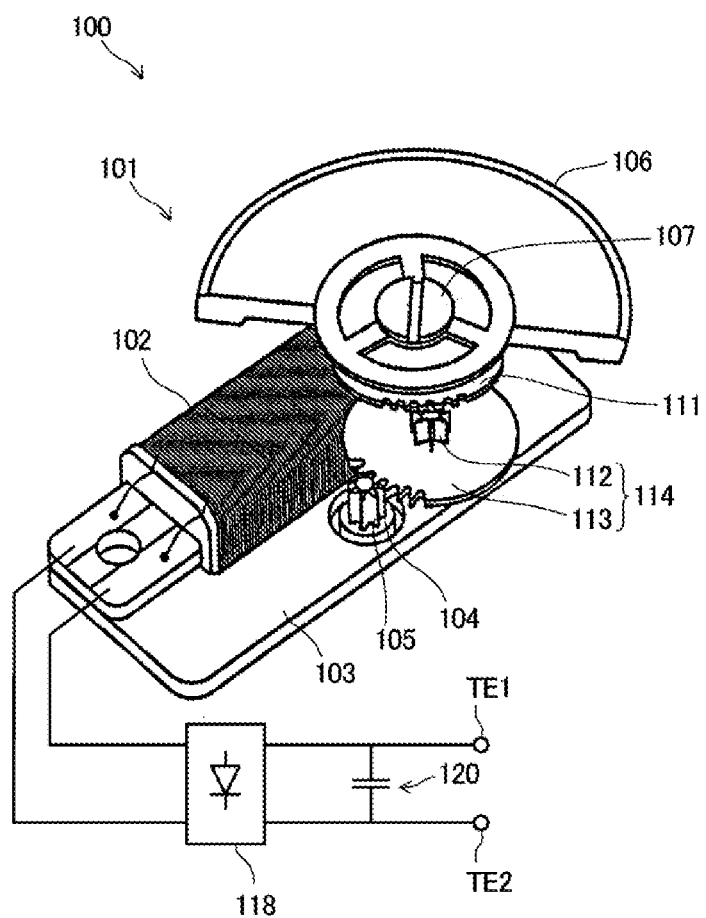
FIG. 3 is a perspective view of a main part of a power generation module.

FIG. 3 is a perspective view of a main part of the power generation module 100.

The power generation module 100 includes a power generation unit 101, a rectifier circuit 118, and a battery 120. The power generation unit 101 includes a power generation coil 102, a power generation stator 103, a power generation rotor 104, an oscillating weight 106, an oscillating weight screw 107, an oscillating weight wheel 111, and a power generation rotor transmission wheel 114. The battery 120 corresponds to an example of a first capacitor unit.

The power generation coil 102 is a coil wound around a high permeability material, and the power generation stator 103 is made of a high permeability material. The power generation rotor 104 includes a permanent magnet and a pinion portion 105. The rectifier circuit 118 and the battery 120 are coupled to the power generation coil 102.

The oscillating weight 106 is a weight eccentric with respect to the rotation axis, and is rotatably supported by the oscillating weight screw 107 together with the oscillating weight wheel 111. The oscillating weight wheel 111 rotates integrally with the oscillating weight 106. The oscillating weight wheel 111 meshes with a pinion portion 112 of the power generation rotor transmission wheel 114, and a gear portion 113 of the power generation rotor transmission wheel 114 meshes with the pinion portion 105. By this gear train, the rotation of the oscillating weight 106 is transmitted to the power generation rotor 104 at a predetermined speed increasing ratio.

When the generator rotor 104 rotates, a direction of a magnetic field interlinking the power generation coil 102 through the power generation stator 103 changes, and an AC voltage is generated in the power generation coil 102 by electromagnetic induction. The AC voltage is rectified by the rectifier circuit 118, and the battery 120 is charged with the rectified voltage. The battery 120 is a secondary battery, and a type, a capacity, etc. of the battery 120 are appropriately selected.

The oscillating weight 106 rotates with the vibration of the housing 200. For example, the oscillating weight 106 is rotated by the movement of the body of the user wearing the housing 200. The rotation of the oscillating weight 106 is accelerated and transmitted to the power generation rotor 104 to rotate the power generation rotor 104 at a high speed. As a result, an AC voltage is generated in the power generation coil 102, and the battery 120 is charged. Terminals TE1 and TE2 at both ends of the battery 120 are coupled to a capacitor 31 to be described below.

Returning to FIG. 1, the capacitor 31 is electrically coupled in parallel to the battery 120. As the capacitor 31, for example, a ceramic capacitor can be employed, but the type and capacity of the capacitor 31 may be appropriately selected. The capacitor 31 corresponds to an example of a second capacitor unit.

A battery voltage V0 of the battery 120 is output to a first power supply circuit 11 and a second power supply circuit 12. The first power supply circuit 11 boosts the battery voltage V0 and outputs a first voltage V1. The first power supply circuit 11 is, for example, a voltage regulator integrated circuit (IC) or a boosting IC.

The first control circuit 21 controls a first drive timing at which the electronic apparatus 1 is activated. The first drive timing is a timing at which the first power supply circuit 11 starts outputting the first voltage V1. To be more specific, the first control circuit 21 outputs a signal S1 to the first power supply circuit 11 when detecting that a voltage value of the battery voltage V0 has reached a first threshold value. The signal S1 is a control signal for instructing the first power supply circuit 11 to start outputting the first voltage V1. A reset IC, for example, can be used as the first control circuit 21, and in this case, the signal S1 is a reset signal for the first power supply circuit 11.

The battery voltage V0 is a voltage between both ends of the battery 120, and the first threshold value is determined based on a specification of the battery 120, etc. The first threshold value is the battery voltage V0 voltage value at which the first power supply circuit 11 can operate stably. For example, when the designed battery voltage V0 is 3.3 V, the first threshold value is 3.3 V or a value within a predetermined range centered on 3.3 V. The first threshold value is set in the first control circuit 21 in advance. Specifically, the first control circuit 21 may be configured to be capable of setting or storing the first threshold value, or the circuit configuration itself of the first control circuit 21 may be designed in accordance with the first threshold value.

The first voltage V1 output from the first power supply circuit 11 is output to the second power supply circuit 12, a second control circuit 22, and a field effect transistor (FET) 23. The FET 23 can be replaced by other types of switching elements.

The second power supply circuit 12 voltage-converts the first voltage V1 and outputs a second voltage V2. The second voltage V2 is supplied to the arithmetic processing unit 51 and drives the arithmetic processing unit 51. In addition, the second voltage V2 may be supplied as a power supply of a circuit, etc. (not illustrated) included in the electronic apparatus 1. The second power supply circuit 12 is configured by, for example, a voltage regulator IC.

The second control circuit 22 controls a second drive timing at which the electronic apparatus 1 is activated. The second drive timing is a timing at which the second power supply circuit 12 starts outputting the second voltage V2. To be more specific, the second control circuit 22 outputs a signal S2 to the second power supply circuit 12 when detecting that a voltage value of the first voltage V1 has reached a second threshold value. The signal S2 is a control signal for instructing the second power supply circuit 12 to start outputting the second voltage V2. A reset IC, for example, can be used as the second control circuit 22, and in this case, the signal S2 is a reset signal for the second power supply circuit 12.

Here, the second control circuit 22 delays the timing of outputting the signal S2 from the first drive timing by a preset delay time. Thus, the second drive timing is delayed from the first drive timing by a predetermined time. The delay time by which the second control circuit 22 delays the signal S2 is preferably, for example, 25 milliseconds or more.

The second threshold value is a voltage value of the first voltage V1 at which the first power supply circuit 11 can be regarded as operating stably. The second threshold value is determined based on, for example, the output voltage of the first power supply circuit 11 in design. For example, when the designed first voltage V1 is 3.7 V, the second threshold value is 3.7 V or a value within a predetermined range centered on 3.7 V. The second threshold value is set in the second control circuit 22 in advance. Specifically, the second control circuit 22 may be configured to be capable of setting or storing the second threshold value, or the circuit configuration itself of the second control circuit 22 may be designed in accordance with the second threshold value.

The FET 23 is a switch for turning on/off the input of the first voltage V1 to a third power supply circuit 13. The FET 23 switches on and off the supply of the first voltage V1 to the third power supply circuit 13 in accordance with a signal S3 input from the arithmetic processing unit 51. When the electronic apparatus 1 is activated, the arithmetic processing unit 51 is activated by the input of the second voltage V2 and starts the control of the electronic apparatus 1. The arithmetic processing unit 51 outputs the signal S3 to the FET 23 at a predetermined timing at which the pulse sensor 60 performs measurement, and causes the third power supply circuit 13 to supply the first voltage V1.

The timing at which the arithmetic processing unit 51 outputs the signal S3 to the FET 23 is a timing after the second power supply circuit 12 starts outputting the second voltage V2. Therefore, the arithmetic processing unit 51 sets the timing at which the third power supply circuit 13 starts outputting a third voltage V3 and/or a fourth voltage V4 to a timing delayed from the first drive timing and the second drive timing. An elapsed time from the first drive timing and the second drive timing is set in advance in the arithmetic processing unit 51. The arithmetic processing unit 51 may control the timing of outputting the signal S3 such that outputting of the third voltage V3 and/or the fourth voltage V4 is started with a delay of a set time from the second drive timing.

The third power supply circuit 13 voltage-converts the first voltage V1 and outputs the third voltage V3 and the fourth voltage V4. The third voltage V3 is a power supply for driving the light-emitting unit 61, and is, for example, 3.3 V. The fourth voltage V4 is a power supply for driving the light receiving unit 62, and is, for example, 1.8 V.

The third power supply circuit 13 is composed of, for example, a voltage regulator IC. The third power supply circuit 13 may be composed of a plurality of ICs. For example, the third power supply circuit 13 may include an IC that voltage-converts the first voltage V1 and outputs the third voltage V3 and an IC that voltage-converts the first voltage V1 and outputs the fourth voltage V4.

The electronic apparatus 1 configured as described above is activated when the voltage of the battery 120 is increased by the power generation of the power generation module 100. When the battery voltage V0 reaches the first threshold value, the first control circuit 21 outputs the signal S1 to the first power supply circuit 11, and accordingly, the first power supply circuit 11 start outputting the first voltage V1 at the first drive timing. Further, based on the output of the first voltage V1, the second control circuit 22 outputs the signal S2 to the second power supply circuit 12 at a timing delayed from the first drive timing.

The second power supply circuit 12 starts outputting the second voltage V2 in response to the input of the signal S2. When the second voltage V2 is output, the arithmetic processing unit 51 is activated and starts to control each unit of the electronic apparatus 1.

Thereafter, the arithmetic processing unit 51 outputs the signal S3 to the FET 23 at a timing at which the pulse sensor 60 detects a pulse wave. When the FET 23 is switched on in response to the signal S3, the third power supply circuit 13 outputs the third voltage V3 and the fourth voltage V4. As a result, the pulse wave sensor 60 detects the pulse wave of the user. The arithmetic processing unit 51 wirelessly transmits the detection result of the pulse wave sensor 60 to a device outside the electronic apparatus 1 through the antenna 52.

When the electronic apparatus 1 is activated, the first power supply circuit 11 start outputting the first voltage V1, so that an inrush current flows from the battery 120. The inrush current also flows from the battery 120 when the second power supply circuit 12 start outputting the second voltage V2. Since the power generation module 100 is a small power generator that can be accommodated in the portable housing 200, the amount of power generated by the power generation module 100 is limited. Therefore, when an inrush current greater than the power charged in the battery 120 flows, the output of the first power supply circuit 11 and/or the second power supply circuit 12 becomes unstable, and there is a possibility that the activation of the electronic apparatus 1 fails.

In contrast, the power supply circuit 10 includes the capacitor 31 coupled in parallel to the battery 120. The capacitor 31 stores power while the battery 120 is charged with the power generation of the power generation module 100. With this configuration, when the inrush current flows in the power supply circuit 10 and the battery voltage V0 decreases, power is supplied from the capacitor 31. Therefore, it is possible to suppress the voltage fluctuation of the battery voltage V0 due to the inrush current.

Further, the second control circuit 22 outputs the signal S2 with a delay from the output of the first voltage V1 so that the second drive timing is delayed by a predetermined time from the first drive timing. Thus, the power supply circuit 10 avoids a state in which the inrush current of the first power supply circuit 11 and the inrush current of the second power supply circuit 12 flow in an overlapping manner. Therefore, the fluctuation of the battery voltage V0 due to the inrush current can be more reliably suppressed.

Figure 4:
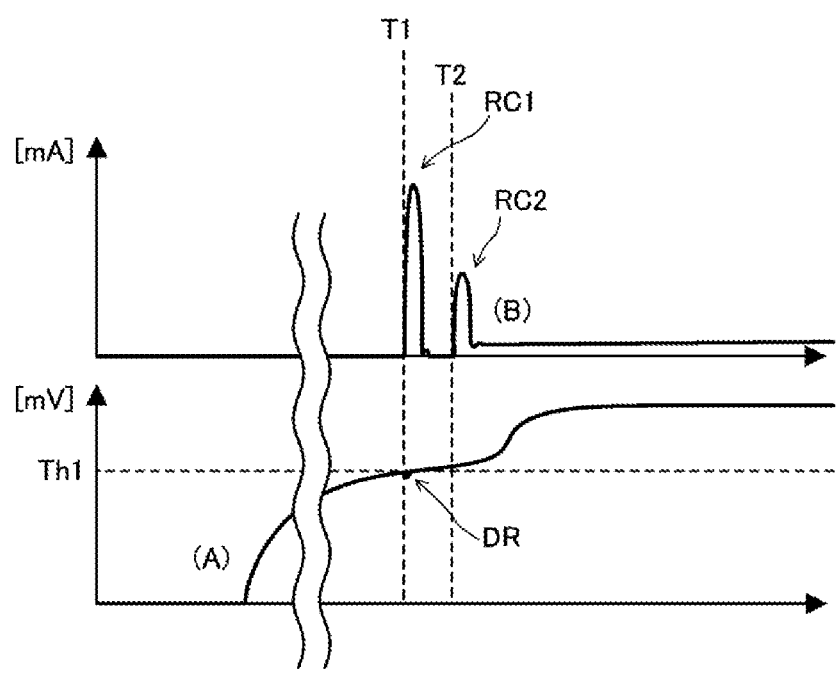
FIG. 4 is a diagram illustrating a voltage fluctuation in a power supply circuit.
Figure 5:
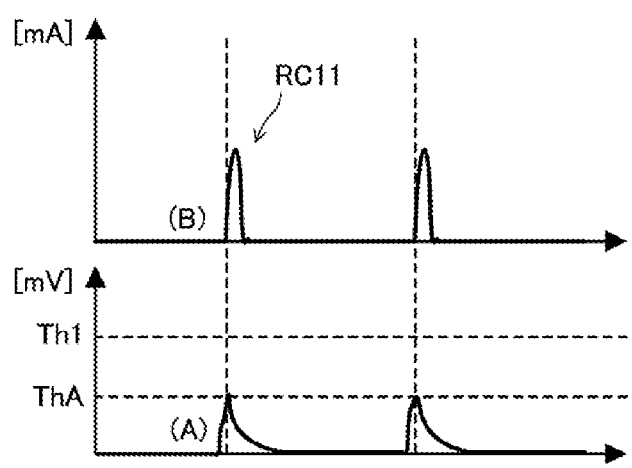
FIG. 5 is a diagram illustrating a voltage fluctuation in a power supply circuit of a first comparative example.
Figure 6:
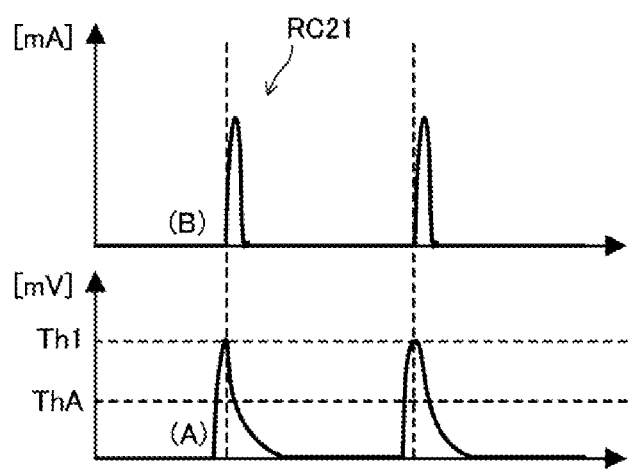
FIG. 6 is a diagram illustrating a voltage fluctuation in a power supply circuit of a second comparative example.

The fluctuations in the inrush current and the battery voltage V0 in the electronic apparatus 1 will be described in contrast to a comparative example. FIG. 4 is a diagram illustrating a voltage fluctuation in the power supply circuit 10. FIG. 5 is a diagram illustrating a voltage fluctuation in the power supply circuit of the first comparative example, and FIG. 6 is a diagram illustrating a voltage fluctuation in the power supply circuit of the second comparative example.

The horizontal axis of the graph illustrated in FIG. 4 indicates the passage of time. The graph (A) in FIG. 4 illustrates the value of the battery voltage V0, and the graph (B) illustrates the current flowing from the battery 120.

When the power generation module 100 starts power generation from a state in which the battery voltage V0 is low, the battery voltage V0 gradually increases. In FIG. 4, a part of the process in which the voltage of the battery 120 increases with the power generation of the power generation module 100 is omitted.

A time T1 is a timing at which the battery voltage V0 reaches the first threshold value Th1. At the time T1, the first control circuit 21 outputs the signal S1 to cause the first power supply circuit 11 to start outputting the first voltage V1. Accordingly, the inrush current flows as indicated by reference character RC1. Here, even when the inrush current greater than the power of the battery 120 flows, the voltage fluctuation of the battery voltage V0 is suppressed by the power charged in the capacitor 31, and the battery voltage V0 is maintained at a value equal to or greater than the first threshold value Th1.

After that, when the second control circuit 22 outputs the signal S2 at a time T2 and the second power supply circuit 12 start outputting the second voltage V2 based on the signal S2, the inrush current flows as indicated by the reference numeral RC2. Since the timing at which the inrush current RC2 flows is shifted from the inrush current RC1, the battery voltage V0 can be maintained at a value equal to or greater than the first threshold value Th1.

The first comparative example illustrated in FIG. 5 corresponds to a configuration in which the capacitor 31, the first control circuit 21, and the second control circuit 22 are not provided in the power supply circuit 10. That is, this configuration corresponds to an example in which the first power supply circuit 11 and the second power supply circuit 12 are coupled to the battery 120. The horizontal axis of the graph illustrated in FIG. 5 indicates the passage of time. The graph (A) in FIG. 5 illustrates the voltage value of the battery charged by the power generation module, and the graph (B) illustrates the current flowing from the battery.

In the first comparative example, the first power supply circuit starts the output before the voltage of the battery reaches the first threshold value Th1 during the process in which the voltage of the battery as the power generation module generates power. That is, when the voltage of the battery reaches an operation start voltage ThA at which the boosting operation of the first power supply circuit can be performed, the operation of the first power supply circuit is started. In the power supply circuit 10 of the present disclosure, the first threshold value Th1 is a value of the battery voltage V0 at which the first power supply circuit 11 can operate stably, and thus is a value higher than the operation start voltage ThA. In a state where the voltage of the battery has reached the operation start voltage ThA, the power charged in the battery is not sufficient for the inrush current. Therefore, when the inrush current flows as indicated by reference sign RC11, the voltage of the battery greatly decreases, and the first power supply circuit stops operation. Therefore, the activation of the electronic apparatus fails. Thereafter, each time the voltage of the battery increases with power generation and reaches the operation start voltage ThA, the same operation is repeated.

The second comparative example illustrated in FIG. 6 corresponds to a configuration in which the first control circuit 21 and the second control circuit 22 are provided in the first comparative example. In other words, the capacitor 31 is provided in the power supply circuit 10. However, in the second comparative example, the second control circuit 22 does not delay the start of operation of the second power supply circuit 12.

The horizontal axis of the graph illustrated in FIG. 6 indicates the passage of time. The graph (A) in FIG. 6 illustrates the voltage value of the battery charged by the power generation module, and the graph (B) illustrates the current flowing from the battery.

In the second comparative example, the first power supply circuit does not start output until the voltage of the battery increases with power generation by the power generation module and reaches the first threshold value Th1. Therefore, the voltage of the battery rises to a voltage higher than that in the first comparative example. When the voltage of the battery reaches the first threshold value Th1 and the first power supply circuit starts operation, the second power supply circuit also starts operation. Therefore, as indicated by reference sign RC21, a large inrush current flows from the battery, so that the voltage of the battery decreases, and the first power supply circuit and the second power supply circuit stop operation. Therefore, the activation of the electronic apparatus fails. Thereafter, each time the voltage of the battery increases with power generation, the same operation is repeated.

As described above, the electronic apparatus 1 according to the first exemplary embodiment includes the power generation module 100 including the power generation unit 101 and the battery 120 that stores power generated by the power generation unit 101. The electronic apparatus 1 includes the pulse wave sensor 60, a drive unit having a plurality of circuits including a circuit that outputs a voltage to the pulse wave sensor 60 based on the power of the power generation module 100, and the capacitor 31 electrically coupled in parallel to the battery 120. The drive unit includes, for example, any one of the first power supply circuit 11, the second power supply circuit 12, and the third power supply circuit 13. The electronic apparatus 1 includes the portable housing 200 that accommodates the power generation module 100, the pulse wave sensor 60, the drive unit, and the capacitor 31.

The power supply circuit 10 is a power supply circuit of an electronic apparatus 1 including the pulse wave sensor 60, and includes the power generation module 100 having the power generation unit 101 and the battery 120 for storing power generated by the power generation unit 101. The power supply circuit 10 includes the drive unit including a plurality of circuits including a circuit that outputs a voltage to the pulse wave sensor 60 based on the power of the power generation module 100. The drive unit includes, for example, any one of the first power supply circuit 11, the second power supply circuit 12, and the third power supply circuit 13. The power supply circuit 10 includes the capacitor 31 electrically coupled in parallel to the battery 120, and is accommodated in the portable housing 200 of the electronic apparatus 1.

According to the electronic apparatus 1 and the power supply circuit 10 of the electronic apparatus 1, by providing the capacitor 31 in parallel with the battery 120, even if the inrush current flows from the battery 120 to the drive unit when the drive unit starts operation, it is possible to suppress the fluctuation of the voltage supplied to the drive unit. Thus, it is possible to reliably activate the drive unit with the power generated by the power generation module 100 and to stably operate the drive unit. For example, even when the power generation module 100 is a small power generator, it is possible to realize stable activation and operation of the electronic apparatus 1.

In the power supply circuit 10, the drive unit includes the first power supply circuit 11, the first control circuit 21, the second power supply circuit 12, and the second control circuit 22. The first power supply circuit 11 outputs the first voltage V1 to the pulse wave sensor 60 based on the power of the power generation module 100. The first control circuit 21 controls the first drive timing at which the first power supply circuit 11 starts outputting the first voltage V1. The second power supply circuit 12 outputs the second voltage V2 from the first voltage V1. The first control circuit 21 controls the second drive timing at which the second power supply circuit 12 starts outputting the second voltage V2. The second control circuit 22 delays the second drive timing from the first drive timing by a predetermined time.

According to this configuration, the second drive timing at which the second power supply circuit 12 starts outputting the second voltage V2 is delayed from the first drive timing at which the first power supply circuit 11 starts outputting the first voltage V1. Thus, the timing at which the inrush current flows from the battery 120 at the time of activation of the first power supply circuit 11 and the timing at which the inrush current flows at the time of activation of the second power supply circuit 12 do not match. Therefore, it is possible to more reliably suppress the fluctuation of the voltage supplied by the battery 120. Therefore, the activation and operation of the electronic apparatus 1 can be further stabilized.

The second control circuit 22 delays the second drive timing by a predetermined time or more from the first drive timing. The predetermined time is, for example, 25 milliseconds. Thus, the timing at which the inrush current flows due to the activation of the first power supply circuit 11 and the timing at which the inrush current flows due to the activation of the second power supply circuit 12 can be more reliably shifted from each other. Therefore, it is possible to more reliably suppress the fluctuation of the voltage supplied by the battery 120. Therefore, the activation and operation of the electronic apparatus 1 can be further stabilized.

The first control circuit 21 detects a voltage value held in at least one of the battery 120 and the capacitor 31, and causes the first power supply circuit 11 to start outputting the first voltage V1 when the voltage value reaches the first threshold value. The second control circuit 22 starts outputting the second voltage V2 after a predetermined time has elapsed from the timing at which the first voltage V1 has reached the second threshold value. As a result, the first power supply circuit 11 is activated after the voltage of the battery 120 has risen to an appropriate voltage value, and the second power supply circuit 12 is activated after the operation of the first power supply circuit 11 has stabilized. Therefore, it is possible to smoothly activate the first power supply circuit 11 and the second power supply circuit 12. Therefore, the activation and operation of the electronic apparatus 1 can be further stabilized.

The pulse wave sensor 60 includes the light-emitting unit 61 that emits detection light and the light receiving unit 62 that detects light from a detection target. The drive unit includes the third power supply circuit 13 that outputs the third voltage V3 and the fourth voltage V4 to the light-emitting unit 61 and the light receiving unit 62, and the arithmetic processing unit 51 that controls the third drive timing at which the third power supply circuit 13 start outputting the third voltage V3 and the fourth voltage V4. The arithmetic processing unit 51 sets the third drive timing to a timing delayed from the first drive timing and the second drive timing. According to this configuration, the timing at which the inrush current flows due to the activation of the third power supply circuit 13 is further delayed from the first drive timing and the second drive timing. Therefore, even when the pulse wave sensor 60 having a large amount of power consumption is driven, it is possible to suppress the fluctuation in the voltage of the battery 120.

The arithmetic processing unit 51, which is operated by the second voltage V2 and wirelessly transmits the detection result of the pulse sensor 60, is provided. According to this configuration, even when the amount of power generated by the power generation module 100 is small, it is possible to stably operate the device that wirelessly transmits the result measured by the pulse wave sensor 60 to an external device.

The housing 200 includes the band 210 that can be attached to the body of the user, and the pulse wave sensor 60 is a sensor that detects body information of the user. According to this configuration, it is possible to stably operate the small-sized electronic apparatus 1 which is attached to the body of the user and includes the sensor for detecting the body information.

2. Second Exemplary Embodiment

Figure 7:
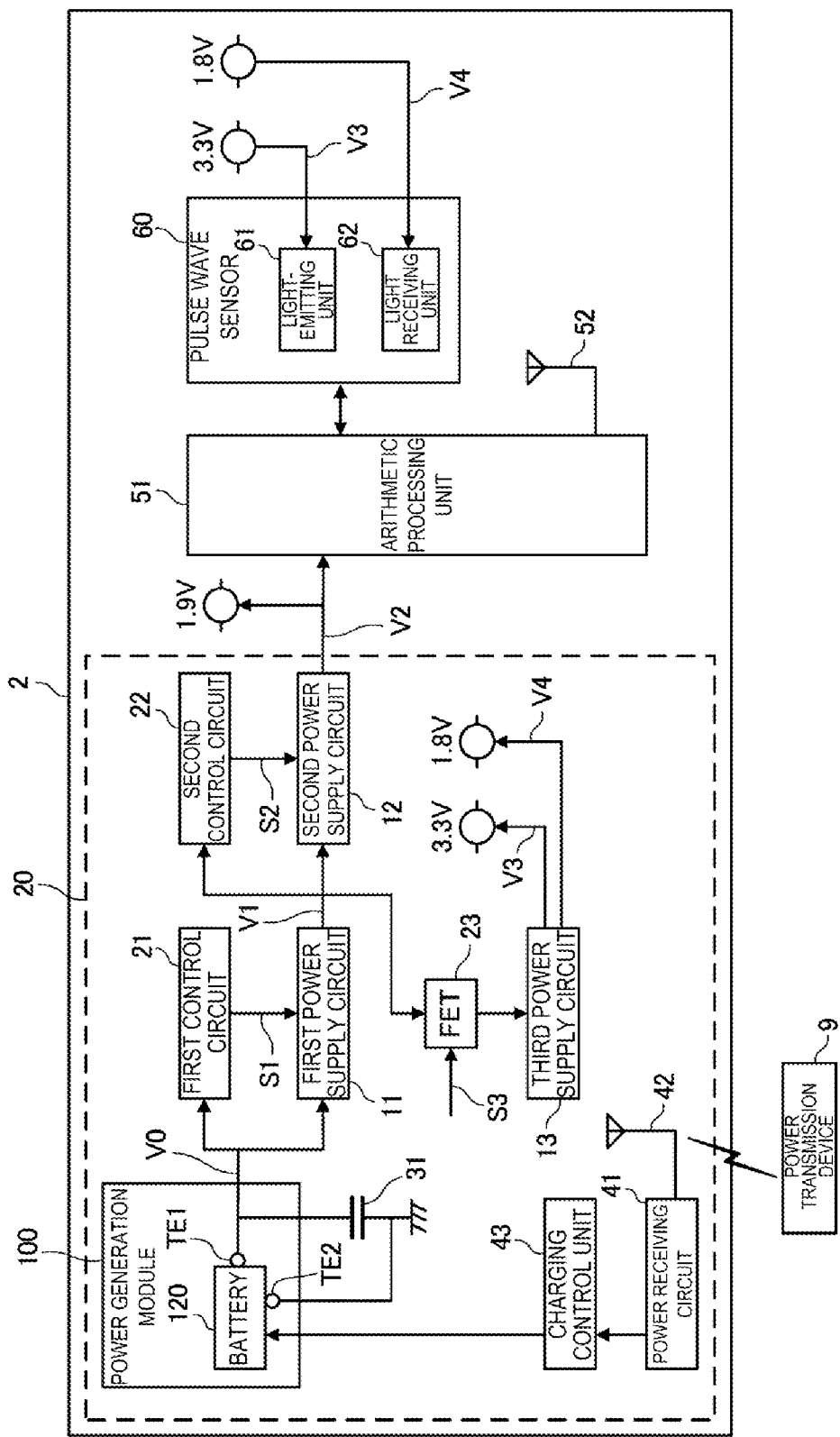
FIG. 7 is a circuit diagram of an electronic apparatus of a second exemplary embodiment.

FIG. 7 is a circuit diagram of an electronic apparatus 2 according to a second exemplary embodiment.

The electronic apparatus 2 includes a power supply circuit 20. The power supply circuit 20 corresponds to a configuration in which a power receiving circuit 41 and a charging control unit 43 are added to the configuration of the power supply circuit 10. The electronic apparatus 2 is different from the electronic apparatus 1 in that the electronic apparatus 2 includes the power supply circuit 20, but the other configurations of the electronic apparatus 2 are the same as those of the electronic apparatus 1 described in the first exemplary embodiment. These common components are denoted by the same reference numerals as those in the first exemplary embodiment, and description thereof will be omitted.

Each unit of the electronic apparatus 2 illustrated in FIG. 7 is accommodated in the housing 200 and is attached to the body of the user, similarly to the electronic apparatus 1.

The power receiving circuit 41 is a circuit that receives power from the power transmission device 9, which is an external device of the electronic apparatus 2. The power receiving circuit 41 is supplied with power from the power transmission device 9 and outputs a voltage to the charging control unit 43. The charging control unit 43 is coupled to the power generation module 100. The charging control unit 43 charges the battery 120 of the power generation module 100 with the voltage output from the power receiving circuit 41. The power receiving circuit 41 corresponds to an example of a power receiving unit.

The power receiving circuit 41 may be, for example, a circuit that includes a connector and receives power supply through a power supply cable coupled to the connector. In the present exemplary embodiment, the power receiving circuit 41 includes an antenna 42. The antenna 42 outputs a voltage to the charging control unit 43 based on an electromotive force generated in the antenna 42 by a radio wave transmitted by the power transmission device 9. For example, the power receiving circuit 41 is a circuit that receives power by an electromagnetic induction method such as a near field communication (NFC) technique. The power receiving circuit 41 may be a circuit corresponding to a magnetic field resonance method, an electric field coupling method, a method using a laser, or other wireless power supply techniques.

As described above, the electronic apparatus 2 includes the power receiving circuit 41 that supplies a voltage to the power generation module 100 based on the power supplied from the power transmission device 9 outside the electronic apparatus 2. As a result, when there is a possibility that the power of the battery 120 is insufficient due to the operation of the electronic apparatus 2, the electronic apparatus 2 can be stably operated by supplying the power from the power transmission device 9.

For example, it is assumed that the power consumption when the arithmetic processing unit 51 executes wireless communication using the antenna 52 is relatively large with respect to the capacity of the battery 120. Depending on the mode of use of the electronic apparatus 2, the amount of power generated by the power generation module 100 may be small and the battery 120 may be insufficiently charged. For example, there is a case where a state in which the amount of vibration applied to the electronic apparatus 2 is small continues for a long time. In such a case, when the electronic apparatus 2 is removed from the body of the user and the arithmetic processing unit 51 performs wireless communication, there is a concern that power will be insufficient.

The arithmetic processing unit 51 monitors the voltage value of the second voltage V2 or the voltage value of the battery voltage V0, and when detecting that the voltage is lower than a predetermined value, the arithmetic processing unit 51 maintains a state in which the wireless communication is not executed.

Here, the arithmetic processing unit 51 may include a memory inside or outside the arithmetic processing unit 51, and may store the detection result of the pulse wave sensor 60. In this case, when the voltage value of the second voltage V2 or the voltage value of the battery voltage V0 becomes a sufficiently high value, the arithmetic processing unit 51 transmits the detection result of the pulse sensor 60 stored in the memory through wireless communication.

For example, in the electronic apparatus 2, it is assumed that the housing 200 of the electronic apparatus 2 is placed at a position close to the power transmission device 9 and power transmission by the power transmission device 9 is started when the arithmetic processing unit 51 is in a state of not executing wireless communication. In this case, the power receiving circuit 41 outputs a voltage to the charging control unit 43 by the power transmission of the power transmission device 9, and the charging control unit 43 charges the battery 120. As a result, the battery voltage V0 increases. Further, when the second voltage V2 is lower than the design value due to a decrease in the battery voltage V0, the second voltage V2 increases as the battery 120 is charged. The arithmetic processing unit 51 can detect an increase in the battery voltage V0 or the second voltage V2 and start wireless communication.

According to the configuration of the electronic apparatus 2 of the second exemplary embodiment, in the same manner as the electronic apparatus 1 described in the first exemplary embodiment, it is possible to obtain an effect that it is possible to reliably activate the drive unit using the power generated by the power generation module 100 and to stably operate the drive unit. Further, according to the electronic apparatus 2, when there is a possibility that the power of the battery 120 is insufficient, even in a state where the power generation module 100 does not generate power, it is possible to quickly charge the battery 120.

In addition, by stopping a part of the load that consumes a large amount of power in the electronic apparatus 2, it is possible to maintain the function of the electronic apparatus 2 even when the charging of the battery 120 is insufficient. For example, the arithmetic processing unit 51 may be set to a so-called standby state in which wireless communication is not temporarily performed or a power saving state. In this case, the power receiving circuit 41 receives power supply from the power transmission device 9, so that all the functions of the electronic apparatus 2 can be quickly used. Therefore, even when the power generation amount of the power generation module 100 is small, it is possible to obtain an effect that convenience of the user is not impaired.

3. Third Exemplary Embodiment

Figure 8:
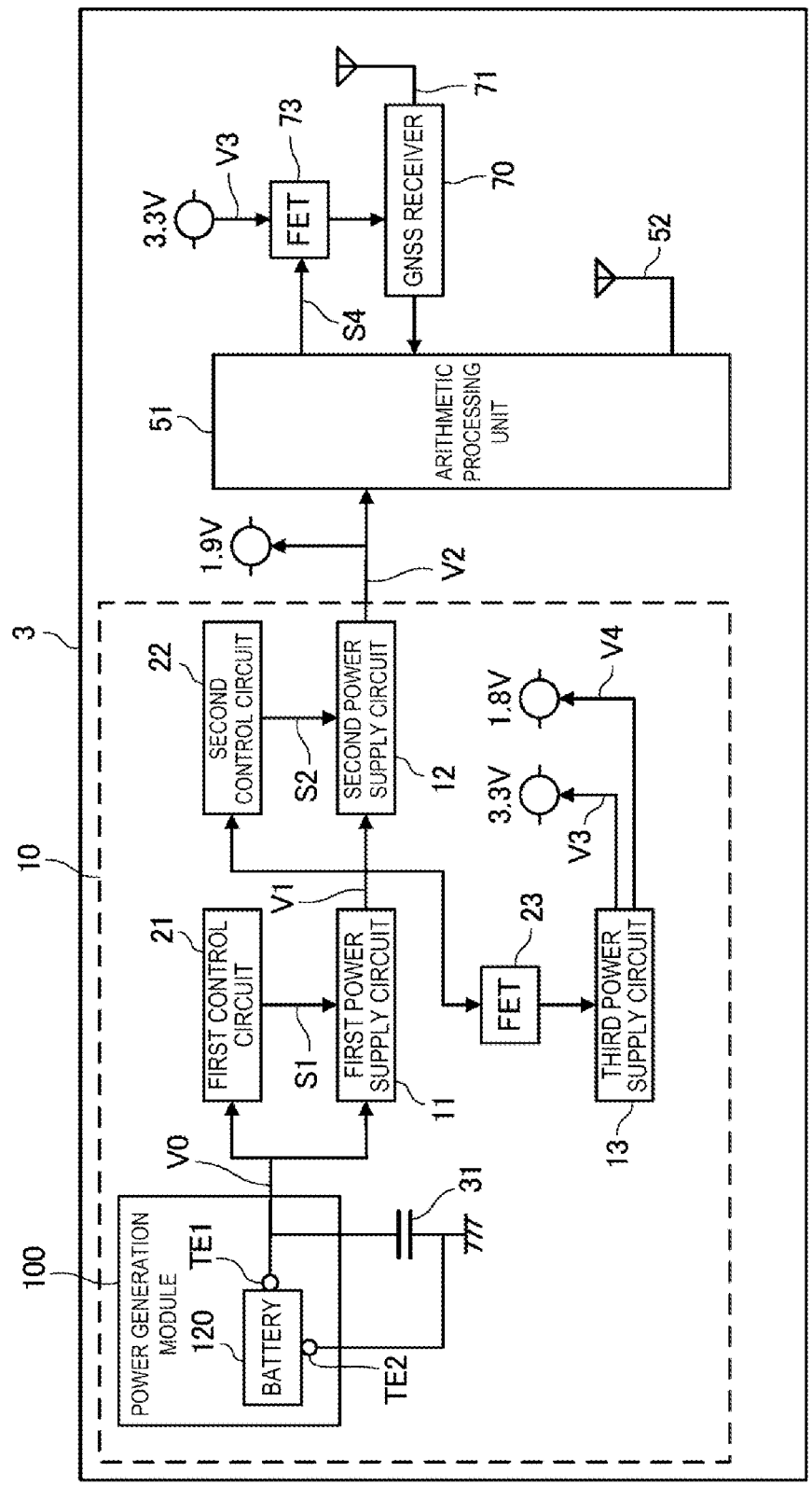
FIG. 8 is a circuit diagram of an electronic apparatus of a third exemplary embodiment.
Figure 9:
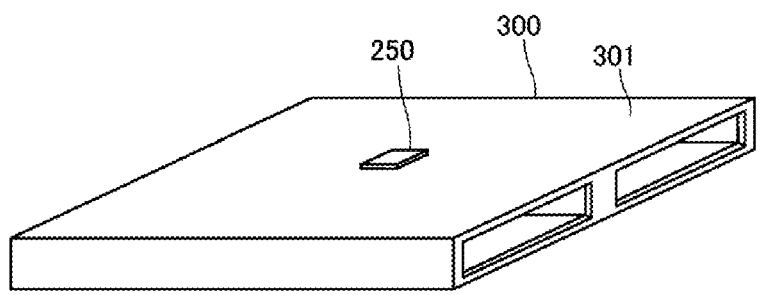
FIG. 9 is a view illustrating an example of use of the electronic apparatus of the third exemplary embodiment.

FIG. 8 is a circuit diagram of an electronic apparatus 3 according to a third exemplary embodiment. FIG. 9 is a view illustrating an example of use of the electronic apparatus 2 of the third exemplary embodiment.

The electronic apparatus 3 includes the power supply circuit 10 as in the electronic apparatus 1 described in the first exemplary embodiment. In the configuration of the electronic apparatus 3, components common to those of the electronic apparatus 1 are denoted by the same reference numerals as those in the first exemplary embodiment, and description thereof will be omitted.

The electronic apparatus 3 includes a Global Navigation Satellite System (GNSS) receiver 70. The GNSS receiver 70 measures a current position of the electronic apparatus 3 by receiving a radio signal transmitted from an artificial satellite through an antenna 71. The GNSS receiver 70 outputs position information indicating the measured position to the arithmetic processing unit 51. The GNSS receiver 70 corresponds to an example of a detection device. The arithmetic processing unit 51 wirelessly transmits the position information indicating the immediate result of the GNSS receiver 70 to a device outside the electronic apparatus 3.

The third voltage V3 output by the third power supply circuit 13 is supplied to the GNSS receiver 70 via a FET 73. The FET 73 is a switch for turning on/off the input of the third voltage V3 to the GNSS receiver 70. The FET 73 switches on and off the supply of the third voltage V3 to the GNSS receiver 70 in accordance with a signal S4 input from the arithmetic processing unit 51. A switching element other than the FET may be used instead of the FET 73.

When the electronic apparatus 3 is activated, the arithmetic processing unit 51 is activated by the input of the second voltage V2 and starts the control of the electronic apparatus 3. The arithmetic processing unit 51 outputs the signal S3 to the third power supply circuit 13 to cause the third power supply circuit 13 to start outputting the third voltage V3. In addition, the arithmetic processing unit 51 outputs the signal S4 to the FET 73 at a predetermined timing at which the position measurement is performed by the GNSS receiver 70, and starts the power supply to the GNSS receiver 70.

The arithmetic processing unit 51 can control the activation timing of the third power supply circuit 13 by controlling the output of the signal S3. When the electronic apparatus 3 includes a device that consumes the third voltage V3 and the fourth voltage V4 in addition to the GNSS receiver 70, there may be a state in which the operation of the third power supply circuit 13 is necessary and the GNSS receiver 70 may be stopped. In such a state, by turning off the FET 73, the arithmetic processing unit 51 can suppress the power consumption amount of the electronic apparatus 3. The GNSS receiver 70 is a device that may consume a large amount of power in a small electronic apparatus 3. Since the arithmetic processing unit 51 controls the power supply to the GNSS receiver 70, it is possible to suppress the power load and to stably operate the electronic apparatus 3 with the power generated by the small power generation module 100.

Each unit of the electronic apparatus 3 illustrated in FIG. 8 may be accommodated in the housing 200 and may be attached to the body of the user, similarly to the electronic apparatus 1.

As illustrated in FIG. 9, the electronic apparatus 3 can be attached to an object other than a human body and used for the purpose of tracking a position.

FIG. 9 illustrates a housing 250 as another example of the housing for accommodating the electronic apparatus 3. The housing 250 is a box-shaped container having a portable size. In the housing 250, it is preferable that the antenna 71 is disposed in the vicinity of the surface of the housing 250 or installed at the surface of the housing 250. The housing 250 is used by being attached to, for example, a pallet 300 on which a cargo is loaded. The pallet 300 is a transport member capable of loading a cargo on a loading surface 301, and is moved by a forklift, etc.

When the housing 250 is attached to the pallet 300, vibration is applied to the housing 250 along with the movement of the cargo, and thus the power generation module 100 can generate power. In addition, by disposing the housing 250 on the loading surface 301 or the side surface of the pallet 300, the GNSS receiver 70 can easily receive a radio signal from an artificial satellite. The housing 250 may be embedded in the loading surface 301 or the side surface of the pallet 300.

The housing 250 is installed at the pallet 300, and information transmitted by the arithmetic processing unit 51 is received by a communication terminal installed at a distribution base or a communication terminal carried by a delivery person, so that the position of the pallet 300 can be tracked and the movement path of the pallet 300 can be recorded.

In addition to the pallet 300, the housing 250 may be used by being attached to, for example, a cardboard box in which a package is accommodated. Alternatively, the housing 250 may be attached to a vehicle or a baggage carried by a person.

According to the configuration of the electronic apparatus 3 of the third exemplary embodiment, in the same manner as the electronic apparatus 1 described in the first exemplary embodiment, it is possible to obtain an effect that it is possible to reliably activate the drive unit using the power generated by the power generation module 100 and to stably operate the drive unit. Further, the electronic apparatus 3 includes the GNSS receiver 70 as a detection device, and detects the position of the electronic apparatus 3 by the GNSS receiver 70 to output position information. Accordingly, there is an effect that it is possible to realize a configuration capable of acquiring and transmitting the position information of the electronic apparatus 3 by using the power generation module 100 which is small in size and generates a small amount of power.

4. Fourth Exemplary Embodiment

Figure 10:
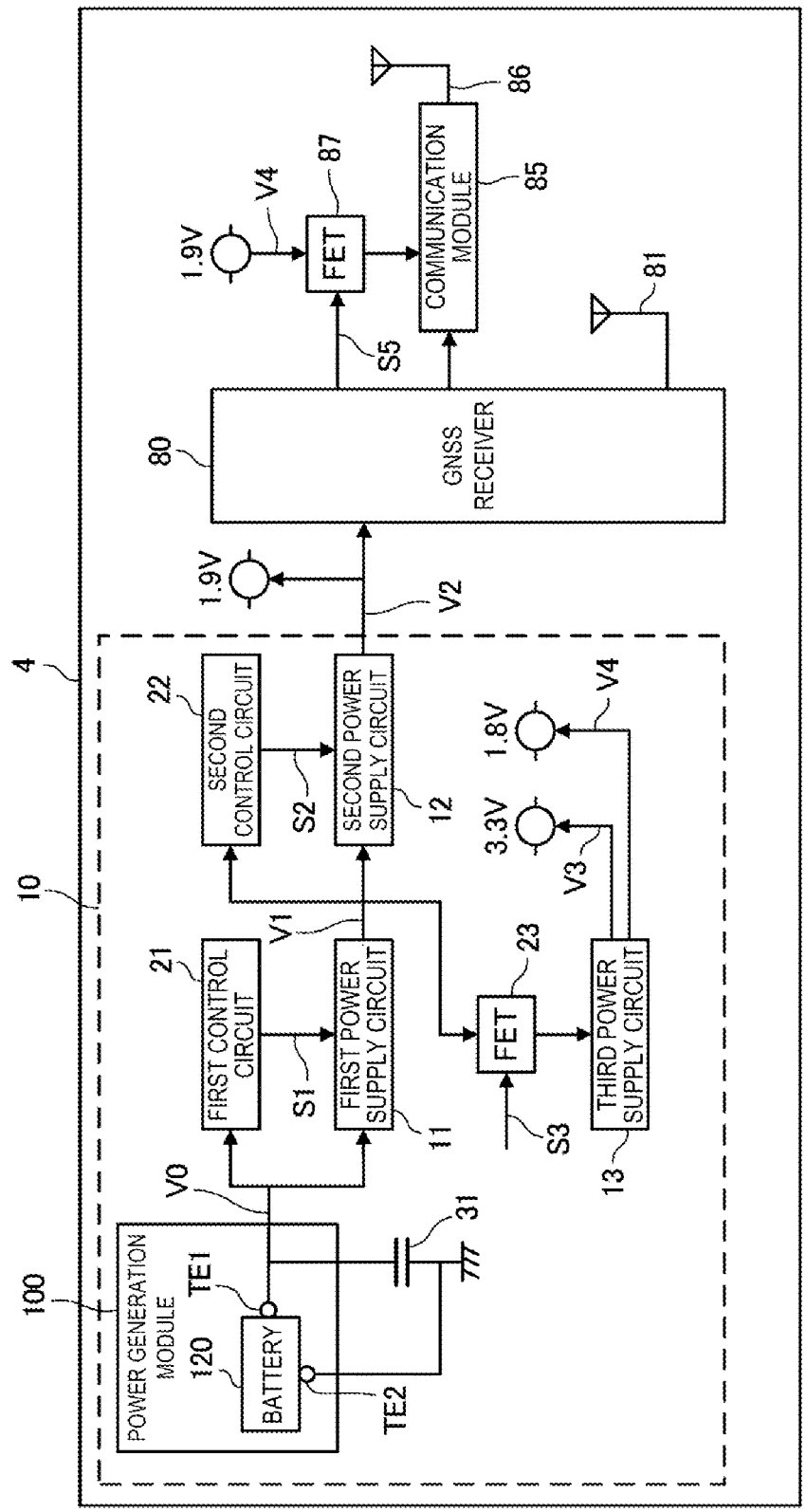
FIG. 10 is a circuit diagram of an electronic apparatus of a fourth exemplary embodiment.

FIG. 10 is a circuit diagram of an electronic apparatus 4 according to an fourth exemplary embodiment.

The electronic apparatus 4 includes the power supply circuit 10 as in the electronic apparatus 1 described in the first exemplary embodiment. In the configuration of the electronic apparatus 4, components common to those of the electronic apparatus 1 are denoted by the same reference numerals as those in the first exemplary embodiment, and description thereof will be omitted.

The electronic apparatus 4 includes a GNSS receiver 80 and a communication module 85. The GNSS receiver 80 measures the current position of the electronic apparatus 4 by receiving a radio signal transmitted from an artificial satellite through an antenna 81. The GNSS receiver 80 corresponds to an example of a detection device. The communication module 85 corresponds to an example of a transmission unit.

The GNSS receiver 80 has a function of controlling each unit of the electronic apparatus 4, similarly to the arithmetic processing unit 51 in the electronic apparatus 1. For example, the GNSS receiver 80 outputs the signal S3 to the FET 23. In addition, the GNSS receiver 80 outputs a signal S5 to a FET 87 which will be described below.

The communication module 85 is a communication device that performs wireless communication. The communication module 85 is capable of long-distance communication as compared with the arithmetic processing unit 51 described in the first to third exemplary embodiments. For example, the communication module 85 may execute a Low Power Wide Area (LPWA) communication method. Specific examples of the communication performed by the communication module 85 include cellular communication such as 5G, 4G, and Long Term Evolution (LTE) and wireless communication such as satellite communication. The communication module 85 includes an antenna 86 for communication.

The fourth voltage V4 output from the third power supply circuit 13 is supplied to the communication module 85 via the FET 87. The FET 87 is a switch for turning on/off the input of the fourth voltage V4 to the communication module 85. The FET 87 switches on and off the supply of the fourth voltage V4 to the communication module 85 in accordance with the signal S5 input from the GNSS receiver 80. A switching element other than the FET may be used instead of the FET 87.

At the time of activation of the electronic apparatus 4, the GNSS receiver 80 is activated by input of the second voltage V2 and starts control of the electronic apparatus 4. The GNSS receiver 80 outputs the signal S3 to the third power supply circuit 13 to cause the third power supply circuit 13 to start outputting the fourth voltage V4. In addition, the GNSS receiver 80 outputs the signal S4 to the FET 87 at a predetermined timing at which communication is performed by the communication module 85, and starts power supply to the communication module 85.

The electronic apparatus 4 can be accommodated and mounted in the housing 200 in the same manner as the electronic apparatus 1 described in the first exemplary embodiment. In this case, the electronic apparatus 4 can be used while being attached to the body of the user. Similarly to the electronic apparatus 3 described in the third exemplary embodiment, the electronic apparatus 4 can be accommodated and mounted in the housing 250. In this case, it is possible to detect the position of the baggage other than the human body, track the baggage, and record the moving route.

The communication module 85 wirelessly transmits position information indicating a positioning result of the GNSS receiver 80 to an external device such as a server. Since the communication module 85 is capable of long-distance communication, even in a state in which there is no communication partner device near the electronic apparatus 4, the communication module 85 can transmit the position information of the electronic apparatus 4 to an external device such as a server. Therefore, restrictions on a timing and a place for transmitting the position information to the external device are significantly relaxed as compared with the electronic apparatus 3.

It is considered that the communication module 85 consumes more power than the arithmetic processing unit 51 described in the first exemplary embodiment. In the configuration of FIG. 10, the GNSS receiver 80 switches the FET 87 to ON at a timing at which communication by the communication module 85 is necessary, and starts supplying the fourth voltage V4 to the communication module 85. Further, after the communication of the communication module 85 is completed, the GNSS receiver 80 can suppress the power consumption amount of the electronic apparatus 4 by switching the FET 87 to OFF.

When the configuration of the electronic apparatus 4 is compared with that of the electronic apparatus 3, the electronic apparatus 4 includes the communication module 85 instead of the arithmetic processing unit 51 in order to enable communication over a longer distance than that of the electronic apparatus 3. In order to suppress an increase in power consumption due to the use of the communication module 85, the electronic apparatus 4 is configured to be capable of turning on/off the power supply to the communication module 85 using the FET 87. Further, in order to control the electronic apparatus 4 while the communication module 85 is stopped, the GNSS receiver 80 is provided with a control function of the electronic apparatus 4. The GNSS receiver 80 may have a function of suppressing power consumption by stopping a core of a processor included in the GNSS receiver 80 while the GNSS receiver 80 does not execute positioning of the electronic apparatus 4.

According to the configuration of the electronic apparatus 4 of the fourth exemplary embodiment, in the same manner as the electronic apparatus 1 described in the first exemplary embodiment, it is possible to obtain an effect that it is possible to reliably activate the drive unit using the power generated by the power generation module 100 and to stably operate the drive unit. Further, the electronic apparatus 4 includes the GNSS receiver 80 as a detection device, and detects the position of the electronic apparatus 4 by the GNSS receiver 80 to output position information. The electronic apparatus 4 can wirelessly transmit the position information detected by the GNSS receiver 80 by the communication module 85, and can suppress the power consumption amount of the communication module 85 by using the FET 87. Accordingly, it is possible to acquire and transmit the position information of the electronic apparatus 4 by using the power generation module 100 which is small in size and generates a small amount of power, and there is an effect that it is possible to realize a configuration which is not easily restricted by a timing and a place for transmitting the position information.

5. Other Exemplary Embodiments

The present disclosure is not limited to the configurations in the exemplary embodiments described above, and can be implemented in various aspects without departing from the gist of the disclosure.

Each of the electronic apparatuses 1, 2, 3, and 4 may have a portable housing. The wristwatch-type housing 200 and the box-type housing 250 described in the present exemplary embodiment are merely examples of specific implementation modes of the electronic apparatuses 1, 2, 3, and 4. The shape, use position, use method, and attachment form on the user's body of the housing 200 and the housing 250 can be changed as appropriate.

The power generation module 100 has been described by taking, as an example, the vibration power generation module in which the oscillating weight 106 is rotated by vibration applied to the housing 200 or the housing 250 to generate power. The power generation module 100 may be configured to generate power by another method. For example, the electronic apparatus 1 may be configured to include a photovoltaic power generation module that generates power by sunlight, instead of the power generation module 100. The photovoltaic power generation module can be configured to include, for example, a photovoltaic panel and the battery 120 that stores power generated by the photovoltaic panel. In this configuration, by coupling the capacitor 31 in parallel to the battery 120, it is possible to obtain the same effect as that of the present exemplary embodiment. Further, for example, the electronic apparatus 1 may be configured to include a temperature difference power generation module that generates power by sunlight, instead of the power generation module 100. The temperature difference power generation module can be configured to include, for example, a temperature difference generator and the battery 120 that stores power generated by the temperature difference generator. In this configuration, by coupling the capacitor 31 in parallel to the battery 120, it is possible to obtain the same effect as that of the present exemplary embodiment. The same applies to a case where the power generation module 100 is mounted on the electronic apparatuses 2, 3, and 4.

In the exemplary embodiment described above, the pulse wave sensor 60, the GNSS receiver 70, and the GNSS receiver 80 are described as examples of the detection device, but these are merely examples. The detection device may be a thermometer, a hygrometer, a clinical thermometer, a blood oxygen level measuring device, an acceleration sensor, a gyro sensor, a magnetic sensor, or other various sensors.

The pulse wave sensor 60, the GNSS receiver 70, and the communication module 85 described in the above exemplary embodiment can be referred to as loads in the electronic apparatuses 1, 2, 3, and 4. Each of the electronic apparatuses 1, 2, 3, and 4 has a configuration in which on/off of power supply to the load is switched by the FET 23, 73, or 87. The arithmetic processing unit 51 and the GNSS receiver 80 can also be referred to as loads of the electronic apparatuses 1, 2, 3, and 4. The loads mounted on the electronic apparatuses 1, 2, 3, and 4 are not limited to the examples described above. For example, the electronic apparatuses 1, 2, 3, and 4 may be configured to include a plurality of the pulse wave sensor 60, the GNSS receiver 70, and the communication module 85. In addition, the electronic apparatuses 1, 2, 3, and 4 may be configured to include various sensors which are not described in the above exemplary embodiments.

The circuit diagrams illustrated in FIGS. 1, 7, 8, and 10 are examples illustrating main configurations of the electronic apparatuses 1, 2, 3, and 4. These drawings are omitted or simplified for convenience of understanding, and do not limit the detailed configurations of the electronic apparatuses 1, 2, 3, and 4. For example, the first power supply circuit 11, the second power supply circuit 12, the third power supply circuit 13, the first control circuit 21, the second control circuit 22, the FET 23, and the other devices constituting the circuit of the electronic apparatus 1 may further include a plurality of devices. Alternatively, a plurality of the above-described devices may be configured by one element. The same applies to the electronic apparatuses 2, 3, and 4.

What is claimed is:
1. An electronic apparatus comprising:
   a power generation module including a power generation unit and a first capacitor unit configured to store power generated by the power generation unit;
   a detection device;
   a drive unit including a plurality of circuits including a circuit configured to output a voltage to the detection device based on power of the power generation module;

a second capacitor unit electrically coupled in parallel to the first capacitor unit; and a portable housing configured to accommodate the power generation module, the detection device, the drive unit, and the second capacitor unit, wherein the drive unit includes:
- a first power supply circuit configured to output a first voltage to the detection device based on the power of the power generation module;
- a first control circuit configured to control a first drive timing at which the first power supply circuit starts outputting the first voltage;
- a second power supply circuit configured to output a second voltage from the first voltage; and
- a second control circuit configured to control a second drive timing at which the second power supply circuit starts outputting the second voltage, and the second control circuit delays the second drive timing from the first drive timing by a predetermined time.

2. The electronic apparatus according to claim 1, wherein the first control circuit is configured to detect a voltage value held in at least one of the first capacitor unit and the second capacitor unit, and cause the first power supply circuit to start outputting the first voltage when the voltage value reaches a first threshold value, and the second control circuit is configured to start outputting the second voltage after the predetermined time elapses from a timing at which the first voltage reaches a second threshold value.

3. The electronic apparatus according to claim 1, wherein the detection device includes a light-emitting unit configured to emit detection light and a light receiving unit configured to detect light from a detection target, the drive unit includes a third power supply circuit configured to output a third voltage to the light-emitting unit and the light receiving unit, and a third control circuit configured to control a third drive timing at which the third power supply circuit starts outputting the third voltage, and the third control circuit is configured to set the third drive timing to a timing delayed from the first drive timing and the second drive timing.

4. The electronic apparatus according to claim 1, comprising a transmission unit operated by the second voltage and configured to wirelessly transmits a detection result of the detection device.

5. The electronic apparatus according to claim 1, comprising a power receiving unit configured to supply a voltage to the power generation module based on power supplied from outside the electronic apparatus.

6. The electronic apparatus according to claim 1, wherein the detection device is configured to detect a position of the electronic apparatus and output position information.

7. The electronic apparatus according to claim 1, wherein the housing includes an attachment jig configured to be attached to a body of a user, and the detection device includes a sensor configured to detect body information of the user.

8. A power supply circuit for an electronic apparatus including a detection device, the power supply circuit comprising:

a power generation module including a power generation unit and a first capacitor unit configured to store power generated by the power generation unit;

a drive unit including a plurality of circuits including a circuit configured to output a voltage to the detection device based on the power of the power generation module; and a second capacitor unit electrically coupled in parallel to the first capacitor unit, wherein the power supply circuit is accommodated in a portable housing included in the electronic apparatus, the drive unit includes:
- a first power supply circuit configured to output a first voltage to the detection device based on the power of the power generation module;
- a first control circuit configured to control a first drive timing at which the first power supply circuit starts outputting the first voltage;
- a second power supply circuit configured to output a second voltage from the first voltage; and
- a second control circuit configured to control a second drive timing at which the second power supply circuit starts outputting the second voltage, and the second control circuit delays the second drive timing from the first drive timing by a predetermined time.

* * * * *